Sept. 11, 1928.  
G. PULLETS  
1,683,987  
MOUNTED AUTOMOBILE JACK  
Filed Sept. 6, 1927 2 Sheets-Sheet 2
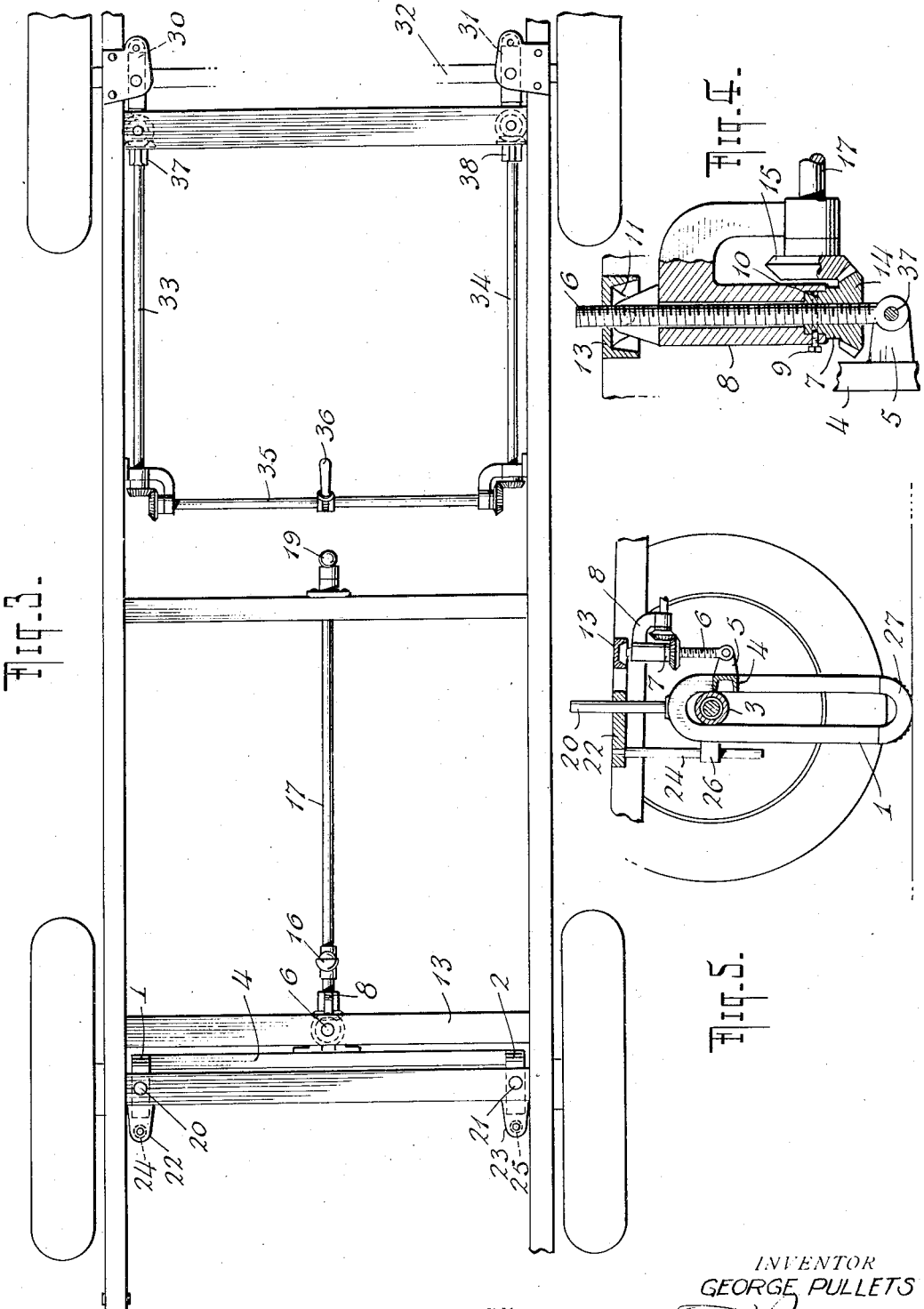
INVENTOR
GEORGE PULLETS
BY
ATTORNEY Patented Sept. 11, 1928.

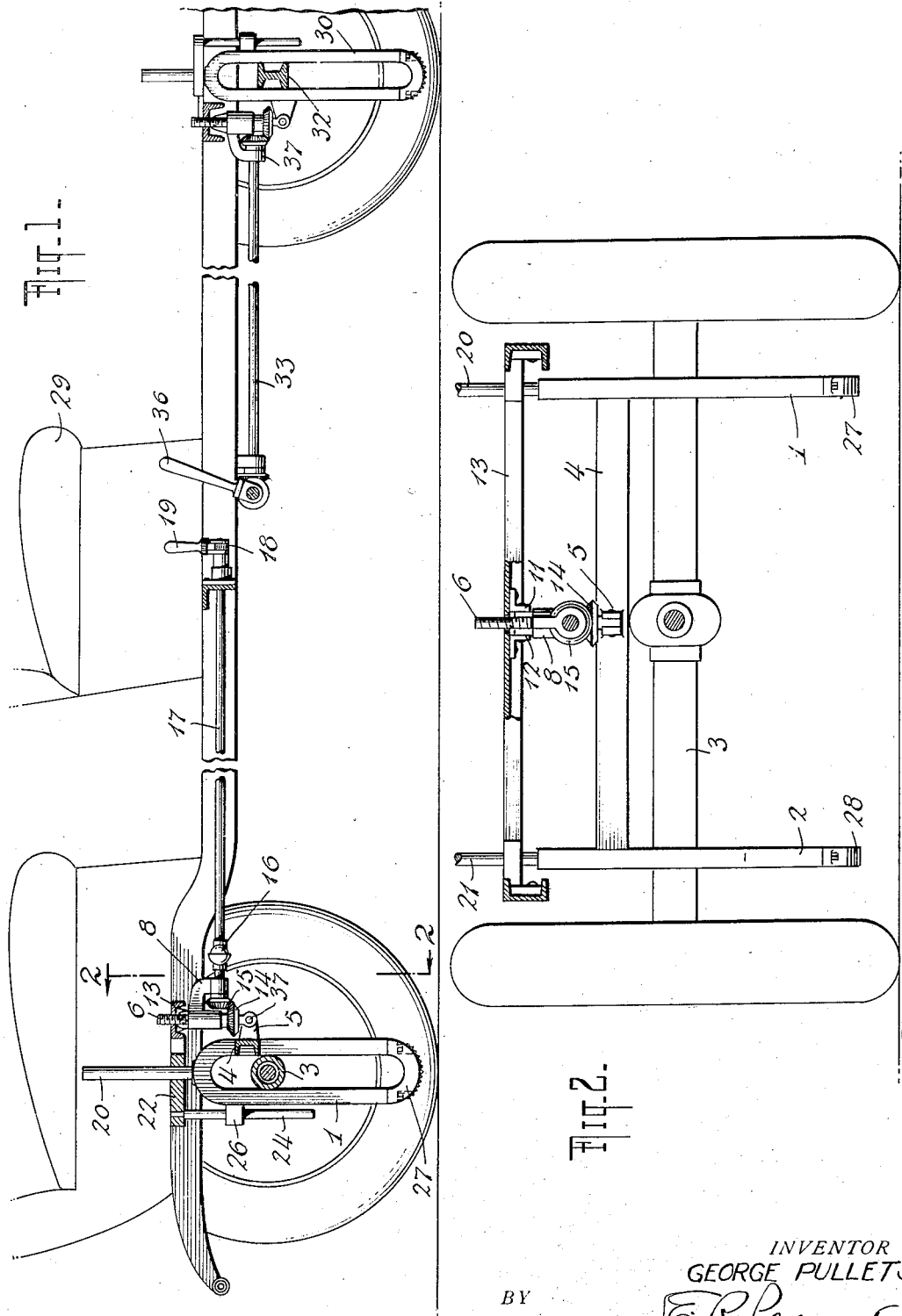

1,683,987

UNITED STATES PATENT OFFICE.

GEORGE PULLETS, OF NEW YORK, N. Y.

MOUNTED AUTOMOBILE JACK.

Application filed September 6, 1927. Serial No. 217,692.

This invention relates to automobile jacks of the type that are mounted on the body or chassis of a car, the object of the invention being to provide a novel and simple means of raising either or both the front and rear ends of a car, without the necessity of getting out of the automobile and going through the operation of setting and manipulating an independent jack. A further object of the invention is to provide an inexpensive construction that will firmly hold the car in its elevated position, and in such a manner as to prevent the slipping of the jack. Other objects will be manifest from the following description.

The following drawings disclose one of the various mechanical forms that may be embodied in the principle of this invention.

Fig. 1 is a side elevation of the mechanism.

Fig. 2 is a front sectional elevation taken at the line 2—2 of Fig. 1.

Fig. 3 is a plan view of the invention.

Fig. 4 is an enlarged section showing the screw lifting mechanism.

Fig. 5 illustrates the lifting portion of the jack holding the car in its elevated position.

Referring to the drawings of the rear end of the car, two slotted frames 1 and 2 are shown mounted over the axle 3 in a sliding fit. Rigidly connecting the two frames is a structural part 4, here shown as a channel bar, to which is secured the bracket 5. Pivotly connected to this bracket is the lifting screw 6 which engages the internally threaded sleeve 7, which is supported by and is free to rotate within the lower end of the bracket 8. The pins 9, of which only one is shown, are secured to the bracket 8 and slidably fit into the groove 10 on the said sleeve. The bracket 8 is attached to the structural parts 11 and 12, which in turn are supported by the cross beam 13. Bevel gear 14, which is attached to, or an integral part of the sleeve 7, intermeshes with the pinion 15 which is supported by an arm of the bracket 8. The universal joint 16 connects the pinion with the shaft 17, which is connected to the reversible ratchet 18 operated by the lever 19. Main guide rods 20 and 21, secured to the frames 1 and 2, respectively, pass through openings in plates 22 and 23 attached to the chassis. Secondary guide rods 24 and 25 are parallel to the main guide rods, are secured to plates 22 and 23, and are received by the openings in the lugs fixed to the frames 1 and 2,—lug 26, for rod 24, being shown in the drawings. Suitably secured to the lower portions of the said frames are detachable U-shaped extremities 27 and 28, with roughened outer surfaces.

In the operation of jacking up the automobile, the chauffeur removes the seat 29, and manipulates the lever and ratchet so as to cause the shaft 17 to rotate, thereby imparting a rotary movement to pinion 15, which movement is transmitted to gear 14 and sleeve 7. As the relative position of the sleeve with respect to the bracket 8 and the chassis of the car is constant and fixed, the rotation of this sleeve will cause a vertical movement of the screw 6, the threads of which are in constant engagement with the internal threads of the sleeve. This vertical movement is imparted, through bracket 5, to the frames 1 and 2, which are thereby caused to slide over the axle 3, guided by the rods 20, 21, 24, and 25. In the lifting operation, the frames move downward until their extremities touch the ground, after which they remain stationary, and at which point the car begins to rise, the axle 3 continuing to slide within the grooves of the frames in the same direction. In the lowering operation, the lever 19 is moved in the opposite direction, causing a reversal of the process hereinbefore described.

Referring to the front part of the car, the mechanism is essentially the same. The frames 30 and 31 are mounted on the axle 32, the other parts of the lifting mechanism being practically identical with that of the rear portion hereinbefore described. However, there is one feature that differs somewhat therefrom. Where the crankcase of the engine extends down rather low, instead of having one central shaft as at 17, the construction embodies an arrangement of two shafts 33 and 34, connected by appropriate gearing to a cross shaft 35, on which is mounted the lever and ratchet 36. In this case, each shaft 33 and 34 connects with an independent screw or other lifting means at 37 and 38.

When the car has been elevated to the desired position, the action of the ratchet and lifting screw, if of an appropriate pitch, will firmly hold the car in its position. The parallel guide posts guide the rise in a fixed direction and prevent any forward, backward, or side movement, thus rigidly holding the automobile in its elevated position.

The universal joint 16 and the hinged arrangement 37 permit freedom of movement of the various parts, and tend to reduce the danger of strain to a minimum.

The detachability of the extremities 27 and 28 permits of a ready assembly of the frames over the axle; and the roughened outer surfaces of the said extremities permit of a firm setting of the apparatus on a hilly or inclined surface.

What I claim is:

1. An automobile jack mounted on the chassis of a car, and comprising a slotted supporting frame mounted on and slidable over the axle of an automobile, a bracket fixed to the chassis and supporting a lifting screw attached to the said frame, an internally threaded sleeve adapted to engage the said screw, and means for turning the said sleeve to produce a vertical movement of the said screw.

2. In a mounted automobile jack a supporting frame containing a slot the side walls of which are adapted to engage the axle of an automobile in a sliding fit so as to permit a vertical movement of the said frame with respect to the said axle, a guide rod mounted on the said frame, and a plate secured to the chassis and containing an opening adapted to receive the said guide rod.

3. In a mounted automobile jack a supporting frame containing a slot the side walls of which are adapted to engage the axle of an automobile in a sliding fit, so as to permit a vertical movement of the said frame with respect to the said axle, a main guide rod mounted on the said frame, a plate secured to the chassis and containing an opening adapted to receive the said main guide rod, a secondary guide rod parallel to the said main guide rod and fixed to the said plate, and a lug mounted on the said frame and containing an opening adapted to receive the said secondary guide post.

4. An automobile jack mounted on the chassis of a car, and comprising a slotted supporting frame mounted on and slidable over the axle of an automobile, a fixed bracket secured to the chassis and supporting geared lifting means for raising and lowering the said frame, a pivotal connection between the said lifting means and the said frame, a hand lever, and a shaft connecting the said lever with the said lifting means through an universal joint.

5. An automobile jack mounted on the chassis of a car and comprising a slotted supporting frame mounted on and slidable over the axle of an automobile, a bracket suitable fixed to the chassis and supporting a lifting screw pivotally attached to the said frame, an internally threaded sleeve adapted to engage the said screw, means for turning the said sleeve to produce a vertical movement of the said screw, and a plurality of parallel guides arranged to permit a vertical movement of the said frame with respect to the said axle.

6. In a mounted automobile jack a slotted supporting frame mounted on and slidable over the axle of an automobile, the lower extremity of the said frame containing, on its outer surface, a roughened portion; a bracket suitably fixed to the chassis, and supporting means for imparting a vertical movement to the said frame with respect to the said axle; a hand lever; a shaft; and a reversible ratchet connecting the said lever with the said shaft to permit of both a raising and a lowering movement of the said frame.

7. In an automobile, a mounted jack comprising a plurality of slotted supporting frames mounted on and slidable over the axles of the automobile, brackets suitably fixed to the chassis and containing and supporting means for raising and lowering the said frames over the said axles, and a plurality of hand levers connected by reversible ratchets to shafts adapted to actuate the said raising and lowering mechanism.

In testimony whereof I affix my signature.

GEORGE PULLETS.